US009057829B2

(12) United States Patent
Lipson et al.

(10) Patent No.: US 9,057,829 B2
(45) Date of Patent: Jun. 16, 2015

(54) TUNABLE OPTICAL APPARATUS, METHOD, AND APPLICATIONS (75) Inventors: Michal Lipson, Ithaca, NY (US); Sasikanth Manipatruni, Hillsboro, OR (US); Gustavo Wiederhecker, Campinas (BR)

(73) Assignee: Cornell University, Ithaca, NY (US)

( * ) Notice: Subject to any disclaimer, the term of this patent is extended or adjusted under 35 U.S.C. 154(b) by 169 days.

(21) Appl. No.: 13/697,560

(22) PCT Filed: May 12, 2011

(86) PCT No.: PCT/US2011/036223
§ 371 (c)(1),
(2), (4) Date: Nov. 13, 2012

(87) PCT Pub. No.: WO2011/143407
PCT Pub. Date: Nov. 17, 2011

(65) Prior Publication Data
US 2013/0064501 A1    Mar. 14, 2013

Related U.S. Application Data (60) Provisional application No. 61/334,611, filed on May 14, 2010.

(51) Int. Cl.
G02B 6/42     (2006.01)
G02B 6/26     (2006.01)
G02B 6/12     (2006.01)
G02B 6/293    (2006.01)

(52) U.S. Cl.
CPC .......... *G02B 6/12007* (2013.01); *G02B 6/2934* (2013.01); *G02B 6/29382* (2013.01)

(58) Field of Classification Search
CPC ............. G02B 6/2934; G02B 6/29341; G02B 6/29343
See application file for complete search history.

(56) References Cited

U.S. PATENT DOCUMENTS 7,062,118 B2   6/2006   Chiu et al.
7,245,801 B2   7/2007   Boyd et al.
(Continued)

FOREIGN PATENT DOCUMENTS

WO   2008094356   8/2008
WO   2010078057   7/2010

OTHER PUBLICATIONS

Wiederhecker, G. S., et al, Controlling photonic structures using optical forces, physics.optics, arXiv:0904.0794v1, Apr. 5, 2009, pp. 1.-5.
(Continued)

*Primary Examiner* — Uyen Chau N Le
*Assistant Examiner* — Chad Smith
(74) *Attorney, Agent, or Firm* — William Greener; Bond, Schoeneck & King, PLLC (57) ABSTRACT A broadly tunable optomechanical apparatus includes a resonator component consisting of two coupled optical microring resonators disposed in a stacked relationship, an input waveguide disposed adjacent a periphery of the resonator component, and a control signal waveguide coupled to the resonator component or the input signal waveguide. A broadband optical switch includes a plurality of resonator components each of which corresponds to a selected signal wavelength, predetermined by the geometry and design of the resonator component, and a respective plurality of output signal waveguides, and a respective plurality of a control signal waveguides each coupled to a respective resonator component. Associated tuning and switching methods and applications are disclosed.

11 Claims, 7 Drawing Sheets (56) References Cited

U.S. PATENT DOCUMENTS

| | | |
|---|---|---|
| 7,389,025 B2 | 6/2008 | Smith et al. |
| 7,446,880 B2 | 11/2008 | Vollmer et al. |
| 7,532,790 B2 | 5/2009 | Smith et al. |
| 7,539,375 B2 | 5/2009 | Popovic |
| 7,853,108 B2 | 12/2010 | Popovic et al. |
| 7,903,909 B2 | 3/2011 | Popovic |
| 2004/0023396 A1 | 2/2004 | Boyd et al. |
| 2006/0078254 A1 | 4/2006 | Djordjev et al. |
| 2009/0116788 A1* | 5/2009 | Rakich et al. .................. 385/32 |
| 2010/0270481 A1 | 10/2010 | Wong et al. |
| 2011/0019186 A1 | 1/2011 | Himmelhaus et al. |

OTHER PUBLICATIONS

Jiang, X., et al., High-Q double-disk microcavities for cavity optomechanics, Optics Express, vol. 17, No. 23, Nov. 9, 2009, pp. 20911-20919.

Rakich, P. T., et al., Trapping, corralling and spectral bonding of optical resonances through optically induced potentials, Nature Photonics, Nov. 1, 2007; doi:10.1038/nphoton.2007.203, pp. 658-665.

Anetsberger, G., et al., Near-field cavity optomechanics with nanomechanical oscillators, Nature Physics, vol. 5, Dec. 2009, pp. 909-914.

Hossein-Zadeh, M., et al., An Optomechanical Oscillator on a Silicon Chip, IEEE Journal of Selected Topics in Quantum Electronics, vol. 16, No. 1, Jan./Feb. 2010, pp. 276-287.

Kang Sung Chul, PCT International Search Report and Written Opinion, KIPO, Dec. 30, 2011.

Turner, A. C., et al., Ultra-low power parametric frequency conversion in a silicon microring resonator, Optics Express, vol. 16, No. 7, pp. 4881-4887, Mar. 31, 2008.

Okamoto, H., et al., Characteristics of an optical filter composed of two vertically coupled microring resonators, IEICE Trans. Electronics, vol. E90-C, No. 6, pp. 1324-1328, Jun. 2007.

* cited by examiner

TUNABLE OPTICAL APPARATUS, METHOD, AND APPLICATIONS

RELATED APPLICATION DATA

The instant application claims priority to U.S. provisional patent application Ser. No. 61/334,611 filed on May 14, 2010, the subject matter of which is herein incorporated by reference in its entirety.

BACKGROUND

Embodiments of the invention are in the field of optomechanical nanophotonics, more particularly to broadly tunable, optomechanical, nanophotonic apparatus, methods, and applications and, most particularly to a broadband nanophotonic switch.

The control of light using optical microcavities has important applications ranging from quantum aspects of light-matter interaction to information routing in advanced photonic net-works. The key characteristic of these cavities is their resonant response, which occurs only when the wavelength of light is an integer fraction of the cavity's optical path length. Therefore in order to reconfigure these devices, a method to tune the optical path length is necessary. Electro-optic tuning has been demonstrated using $LiNBO_3$, however only sub-nanometer (nm) tuning was achieved; thermo-optic or free-carrier injection based tuning has also been demonstrated with tens of nm tuning range. These methods however not only are limited to materials with high thermo-optic coefficients or strong free-carrier dispersion, but also require high temperatures (>400° K) or suffer from free-carrier induced losses.

Another way to control the cavity length is to manipulate their mechanical degrees of freedom. Such manipulation can be achieved using the optical forces provided by photons circulating inside the optical microcavities. For example, it has been shown that optical gradient forces can be used to actuate the mechanical motion in these cavities with tuning ranges on the order of 2 nm, and also proposed as a tuning method for various waveguide and microcavity parameters.

In view of the foregoing mentioned shortcomings and problems in the current state of the art, the inventors have recognized the advantages and benefits that would be provided by a solution to these problems and other known shortcomings in the art, particularly by apparatus, methods, and applications that enable a large tuning bandwidth (e.g., over the entire C and/or L telecommunications bands) and, which, are conveniently manufacturable by standard CMOS processes.

SUMMARY

An embodiment of the invention is a tunable optomechanical apparatus. The apparatus includes a resonator component consisting of two coupled optical microring resonators disposed in a stacked relationship, having an air gap between the stacked resonators that is between about 50 to 400 nanometers (nm); an input signal waveguide disposed adjacent a periphery of the resonator component in a manner that allows evanescent coupling of light from the input signal waveguide into a resonant cavity of the resonator component; and a control signal waveguide coupled either the resonator component or the input signal waveguide. In various non-limiting, exemplary aspects:

the resonator component is characterized by an optical quality factor, Q, where Q is in the range of between about 1,000 to 100,000;

the resonator component is characterized by an optical quality factor, Q, where Q is in the range of between about 15,000 to 22,000;

each of the optical microring resonators is in the form of a disc, or a ring with spokes, and which are supported by a central hub structure the resonator component has a diameter from about five microns (µm) to about 100 µm;

each of the resonator components has a diameter of 30 µm+/−several microns;

the air gap is between about 150 nm to 200 nm;

the apparatus further includes an output signal waveguide disposed adjacent a periphery of the resonator component in a manner that allows evanescent coupling of light from the resonator cavity into the output signal waveguide;

the apparatus further includes a plurality of resonator components each of which corresponds to a selected signal wavelength, predetermined by the geometry and design of the resonator component, and a respective plurality of output signal waveguides;

the apparatus further includes a respective plurality of a control signal waveguides each coupled to a respective resonator component.

The above disclosed embodiments and aspects of the invention are in the form of tunable, broadband optical filters, resonators, and switches and more particularly, for example, an optically controlled, reconfigurable optical spatial routing switch.

An embodiment of the invention is a method for selectively propagating an optical signal. The method includes the steps of providing an apparatus including a resonator component consisting of two coupled optical microring resonators disposed in a stacked relationship, having an air gap between the stacked resonators that is between about 50 to 400 nanometers (nm), an input signal waveguide disposed adjacent a periphery of the resonator component in a manner that allows evanescent coupling of light from the waveguide into a resonant cavity of the resonator component, a control signal waveguide coupled to the apparatus, and an output signal waveguide disposed adjacent a periphery of the resonator component in a manner that allows evanescent coupling of light from the cavity of the cavity of the resonator component into the output signal waveguide; propagating an input optical signal, $\lambda_1$, along the input signal waveguide; evanescently coupling the input optical signal into the resonator component cavity by suitably changing the air gap dimension using a radiative force from a control signal evanescently coupled into the resonator component; and outputting the coupled input optical signal, $\lambda_1$, to the output signal waveguide. In various non-limiting, exemplary aspects:

the method further includes providing a plurality of resonator components each corresponding to a selected signal wavelength, and a respective plurality of output signal waveguides, propagating the input optical signal along the input signal waveguide, wherein the input optical signal includes a plurality of wavelengths $\lambda_1, \lambda_2, \ldots \lambda_n$, evanescently coupling a selected one of the input optical signal wavelengths into the respective resonator component, and outputting the coupled selected one input optical signal to the respective output signal waveguide;

providing a respective plurality of control signal waveguides each coupled to a respective resonator component.

BRIEF DESCRIPTION OF THE DRAWINGS

The features described herein can be better understood with reference to the drawings described below. The drawings are not necessarily to scale, emphasis instead generally being placed upon illustrating the principles of the invention. In the drawings, like numerals are used to indicate like parts throughout the various views.

FIG. 1 (*a-e*) are scanning electron micrographs showing various views of a tunable, optomechanical, nanophotonic apparatus according to a non-limiting, illustrative exemplary embodiment of the invention;

FIG. 3 shows: (a) two simulated mechanical floppy modes and their respective effective masses; (b) effective mechanical linewidth normalized by the intrinsic mechanical linewidth ($\Gamma''_m/\Gamma_m$) as a function of the normalized pump laser frequency detuning ($\Delta/\Gamma$). The blue-detuned pump laser induces gain, which above a certain threshold induces regenerative mechanical oscillations. The dashed curved line indicates the optical resonance profile whereas the dashed straight green line shows the oscillation threshold; (c) maximum static tuning predicted by Eq. (2) before reaching oscillation threshold versus the loaded optical quality factor. The different lines corresponds to the threshold for the two different mechanical modes shown in (a). The dashed vertical line indicates the loaded optical Q of the tested device, according to an illustrative aspect of the invention;

FIG. 5 illustrates optomechanical tuning of a double-ring cavity; (a) Measured probe laser transmission for a pump power of 13 mW. The different curves are recorded at distinct pump laser detuning from the cavity resonance, the bottom and top curves are recorded when the pump laser is out of resonance and fully resonant, respectively; the micrographs on the right show the cavity color recorded corresponding to the transmission curves indicated by the arrows; (b) Measured optical transmission of the pump laser at increasing power levels; (c) RF spectrum showing the optomechanical amplification of the mechanical resonance, even at maximum amplification (yellow curve) the measured mechanical quality factor is 30; (d) RF spectrum of the transmitted pump laser showing the optical spring effect on the mechanical resonance. The highlighted regions (e, g) show the anti-crossing between the mechanical resonant modes. The false color scale represents the RF power in dBm; (f, g) Simulated bright and dark mechanical modes corresponding to the anti-crossings observed on (e, g), according to an illustrative aspect of the invention;

DETAILED DESCRIPTION OF EXEMPLARY EMBODIMENTS

Figure 1:
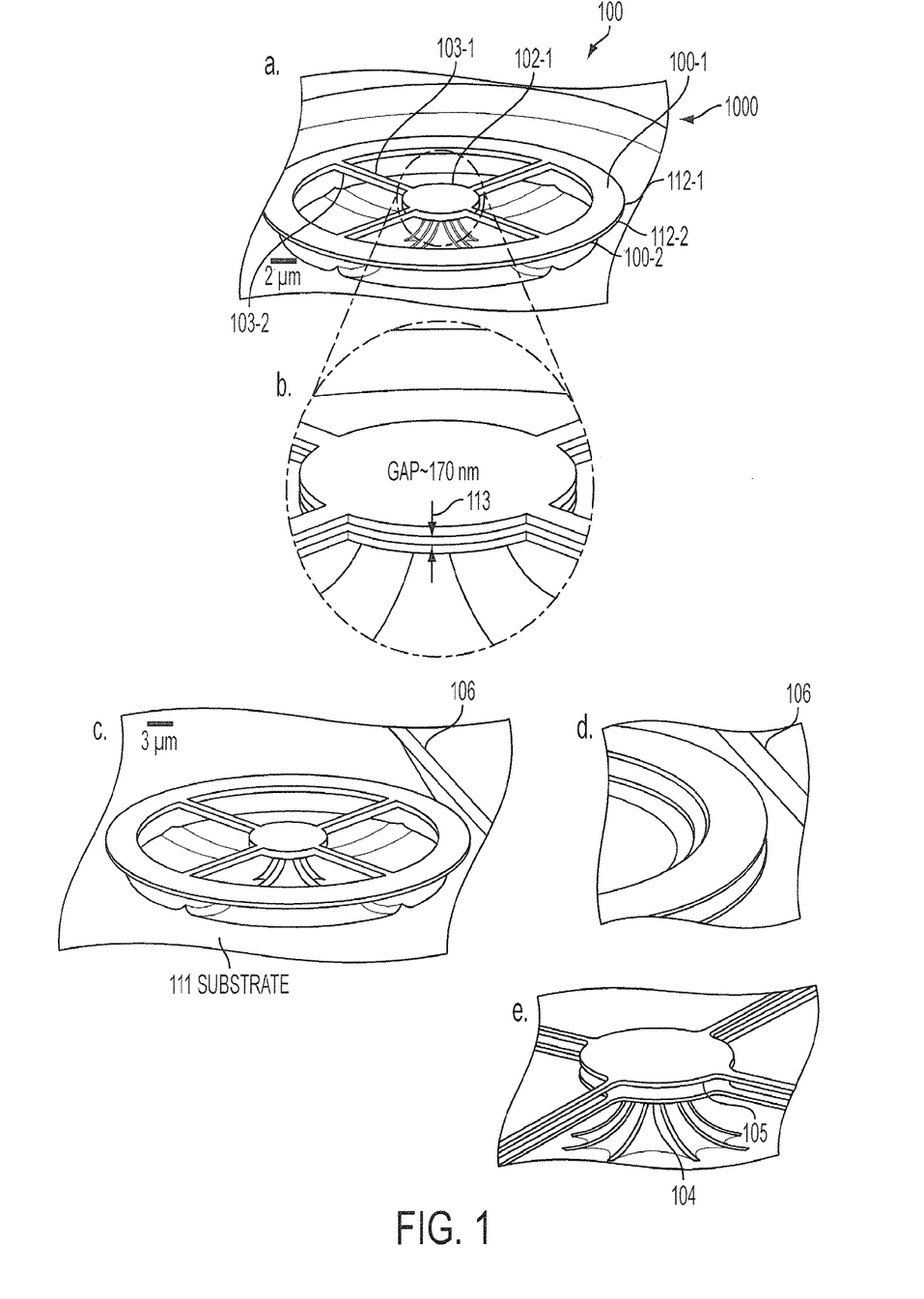
Figure 4:
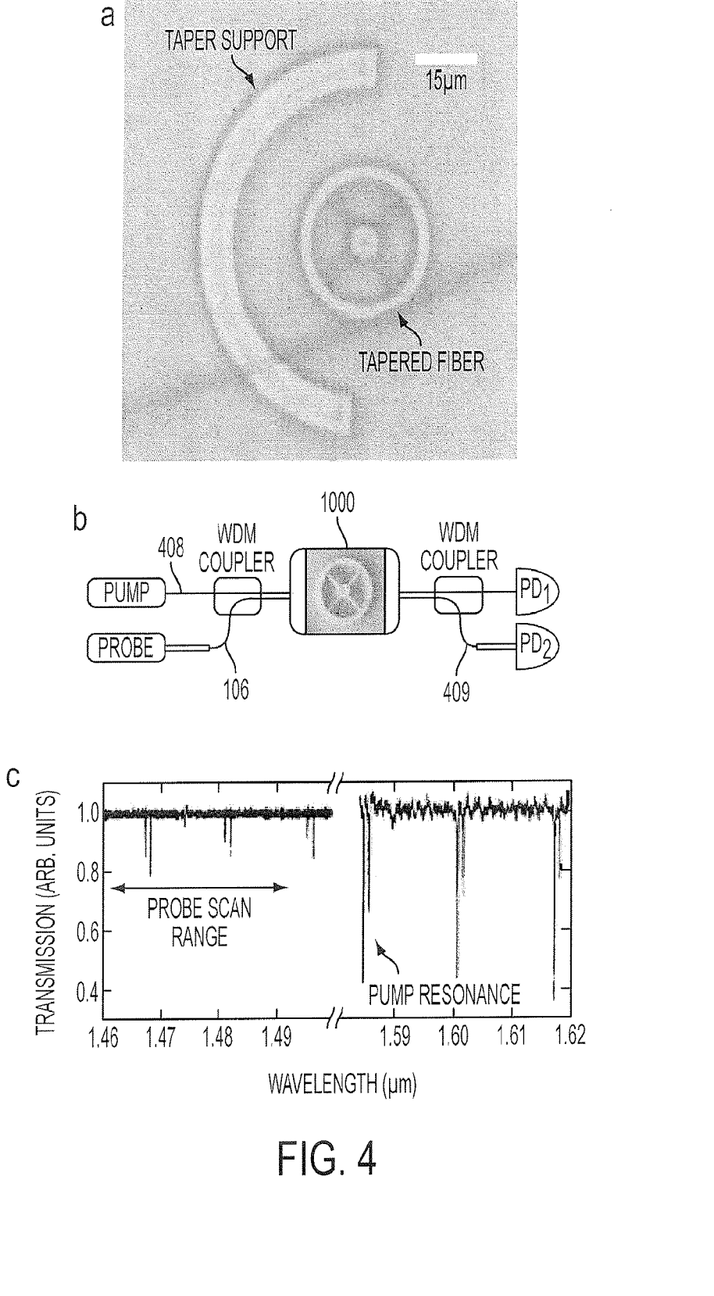
FIG. 4: (a) shows a top view optical micrograph of the device showing a tapered optical fiber used to support the device; (b) schematic of the experimental setup, $PD_{1,2}$ denotes the two photodiodes used to record the pump and probe transmission; (c) low power (100 nW) optical transmission of the cavity highlighting both the probe (1460-1500 nm) and pump (1575-1620 nm) wavelength region, according to an illustrative aspect of the invention.

FIG. 1 (*a-e*) are scanning electron micrographs showing various views of a non-limiting, illustrative, tunable, optomechanical, nanophotonic apparatus 100. The apparatus is based on two coupled optical ring resonator cavities 100-1, 100-2, which are stacked one (100-1) above the other (100-2), creating an inter-ring air gap 113 having sub-wavelength dimensions, referred to hereinafter as the 'resonator component' 1000. In this exemplary aspect, the resonator components are in the form of rings per se and each structure has a central hub portion 102-1, 102-2, a peripheral portion 112-1, 112-2, and a series of support spokes 103-1, 103-2, which connect the respective hub and peripheral portions and provide a compliant structure. The resonator components are fabricated on a $SiO_2$ substrate and the bottom ring 100-2 is supported by pedestal 104 while the top ring 100-1 is supported by a pedestal 105 in-between the hubs 104, 105 (as more clearly seen in FIG. 2). An input (probe) signal waveguide 106 is also fabricated in the substrate surface such that signal light of wavelength $\lambda_n$ propagating in the waveguide 106 can evanescently couple between the waveguide and a resonator component cavity. As illustrated in FIG. 4b, the apparatus also includes a control (pump) signal waveguide 408 that is coupled to at either the resonator component 1000 or to the input signal waveguide 106 via known coupler apparatus and methods. In the apparatus illustrated in FIG. 1, the ring diameter is 30 microns (μm) and the air gap 113 is approximately 170 nanometers (nm), however, an air gap in the sub-wavelength range between about 50 to 400 nm may suitably be used. Furthermore, both of the ring resonator components could alternatively be in the form of solid discs, or one could be a disc and the other a ring with spokes. In further alternative aspects, the spokes could be other than straight as shown (e.g., curved, coiled, spiral, etc.) and could be in the form of springs rather than beams (spokes).

Figure 2:
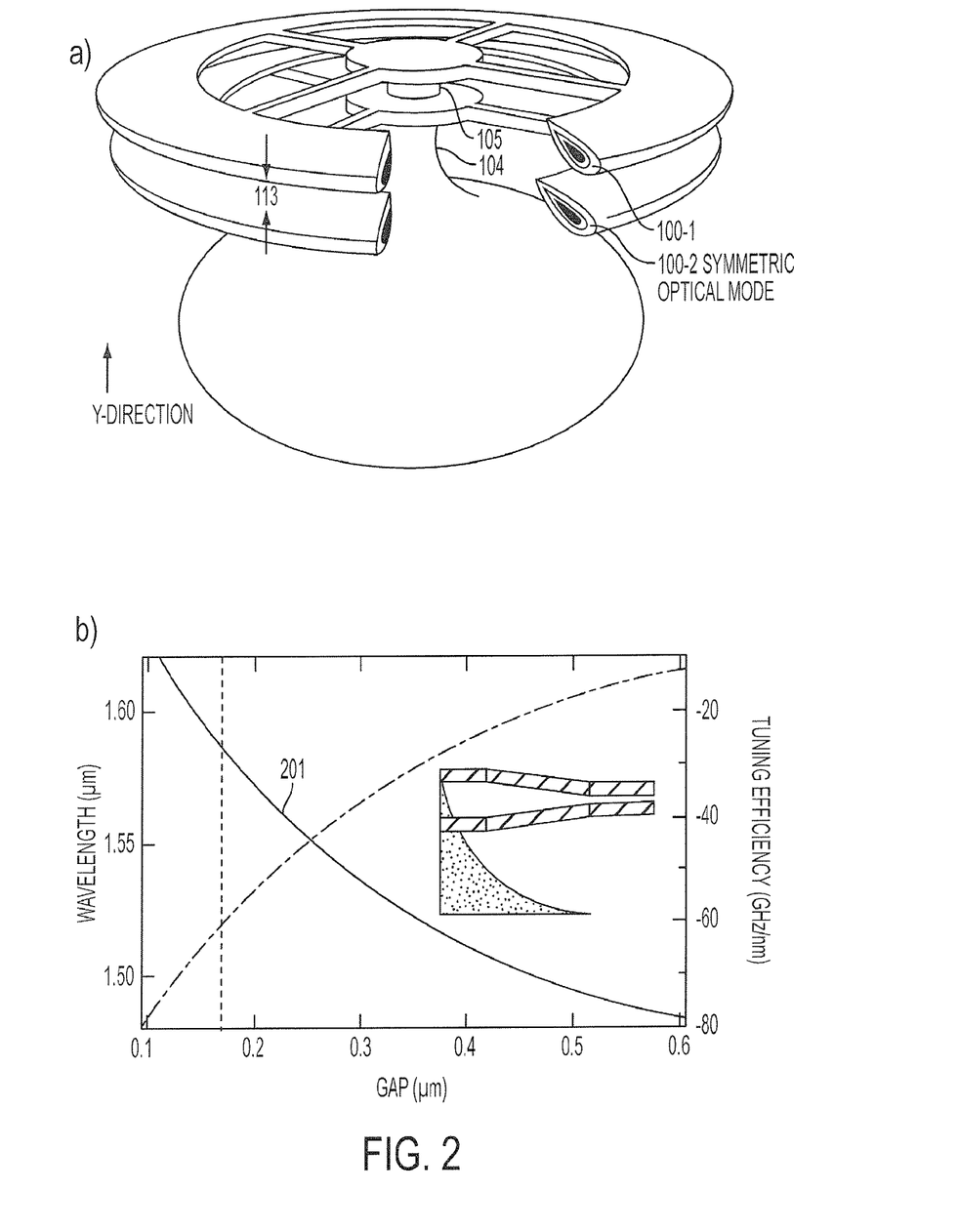
FIG. 2 is a schematic of a tunable, optomechanical, nanophotonic apparatus with a sliced cross-section showing the $TE_1$ symmetric optical mode profile in a resonant cavity, according to an illustrative aspect of the invention.

The sub-wavelength air-gap between the rings allows for strong coupling between the optical modes of the two rings. For exemplary air gaps around 170 nm, the optical modes in each ring cavity evanescently couple to each other forming symmetric and anti-symmetric optical super-modes. FIG. 2a schematically shows a resonator apparatus having a sliced cross section showing the $TE_1$ symmetric optical mode profile in the ring cavities. The coupling induces a splitting in their resonant wavelength which depends exponentially on the gap between the rings, as shown in the curve 201 of FIG. 2b for the symmetric optical super-mode. Therefore this gap-dependence of the optical resonances can be used to tune the microcavities' optical response.

According to the simulated curve 202 in FIG. 2b, a telecom band tuning of 30 nm can be achieved with a gap change of only 60 nm. In the illustrated embodiment, the force to drive such a change can be derived from the optical field gradient in the cavity. The optical energy inside the cavity depends on the optical mode resonant frequency ($U = Nh_{bar}\omega$, where is N is the number of photons circulating in the cavity, $\omega$ is the cavity mode optical resonant frequency, $h_{bar}$ is Planck's constant), therefore the cavity's optical energy also depends on the gap between the two ring resonators; an optical force between these rings should follow using a virtual work approach. The optical potential energy change inside the cavity ($Nh_{bar}\delta\omega$) must correspond to the mechanical work realized on the microrings ($-F\delta y$), therefore the optical force is given by $F = -Nh_{bar}g_{om}$, where $g_{om} = \partial\omega/\partial y$ is the optomechanical tuning efficiency. This tuning efficiency is shown as the curve 202 in FIG. 2b. When operating at small gaps (e.g., ≈170 nm), the resonant frequency tuning efficiency $g_{om}/2\pi$ can be as high as 60 GHz/nm, which corresponds to a 40 fN/photon optical gradient force.

Device Fabrication

An exemplary apparatus was fabricated as follows: Two layers (each ~190 nm thick) of stoichiometric $Si_3N_4$ were deposited using low-pressure chemical vapor deposition (LPCVD) while a ~300 nm thick $SiO_2$ layer was deposited by plasma-enhanced chemical vapor deposition (PECVD). The underlying substrate was ~4 nm $SiO_2$ formed by thermal oxidation of a silicon wafer. Since the top $Si_3N_4$ layer was deposited over a PECVD $SiO_2$, the surface roughness of the top layer was expected to be larger than the bottom layer, decreasing its optical quality. In order to have a single coupling waveguide, which increases the coupling and thus extinction ratio of the anti-symmetric (AS) modes, we performed two lithography steps. First circular pads were defined in the position where the cavities would be patterned. The upper $Si_3N_4$ layer was then etched everywhere else except the circular pads region. In the second lithography step, both the wheel pattern and the waveguide were defined, however, the wheels are defined on top of the previously defined circular pads. Only then the intermediate $SiO_2$ and the bottom $Si_3N_4$ layer were etched. As a result the waveguide had a single $Si_3N_4$ layer, whereas the wheels had two layers of $Si_3N_4$. After depositing a 1 μm thick protective $SiO_2$ cladding using PECVD, we used optical lithography to pattern the spun photoresist with a rectangular window around the resonators. In order to release the structure, the device was immersed in buffered hydrofluoric acid for an isotropic etch of the $SiO_2$ in the window region. To avoid stiction of the stacked disks, the device was subsequently dried using a critical point dryer. Due to the internal tensile stress ($s_0 = 1$ Pa) of the $Si_3N_4$ films, there was a noticeable bending of the rings in the vertical direction. Due to such bending, the actual gap between the resonators was larger than the sacrificial $SiO_2$ layer thickness, which was estimated from the SEM image to be g=170±50 nm.

The fabricated microcavity structure described above was optimized to achieve maximum optical frequency tuning and per-photon optical gradient force. Such optomechanical frequency tuning can be expressed as a function of the optical power in the air gap. When a pump laser excites the symmetric super-mode resonance, the flexible spokes bend in response to the optical gradient force. The gap between the rings reduces and the optical resonant frequency of this mode decreases as shown in FIG. 2b. The cavity optical frequency shift due to mechanical displacement is given by $\Delta\omega = g_{om}\Delta y$, where $\Delta y$ is the gap change between the rings. These relations can be combined with Hooke's law ($F = k\Delta y/2$, where k is the stiffness of the rings in response to the gradient optical force to yield an expression for the cavity frequency shift and the optical power coupled to the cavity, $$\Delta\omega = -2Q_i g_{om}^2 P_d / \omega_0^2 k, \quad (1)$$

where $Q_i$ is the intrinsic optical quality, $\omega_0$ is the optical resonant frequency, and $P_d = (1-T)P_{in}$ is the power dropped to the cavity resonance with normalized transmission T. According to Eq. (1), the optomechanical tuning $g_{om}$ and the beam stiffness k are the two cavity parameters that can be engineered in order to achieve large optical frequency tuning. In practice, to increase $g_{om}$, as shown in FIG. 2b, the intercavity air gap is advantageously small.

The double-ring optical cavity structure illustrated herein can have optical and mechanical parameters such as $g_{om}$, $Q_i$ and k that increase the threshold for regenerative mechanical oscillations in the cavities and enables large static tuning. When the regenerative oscillation threshold is reached, one or more mechanical modes of the structure will oscillate with a large amplitude leading to a strong modulation of the light transmitted by the cavities.

Figure 3:
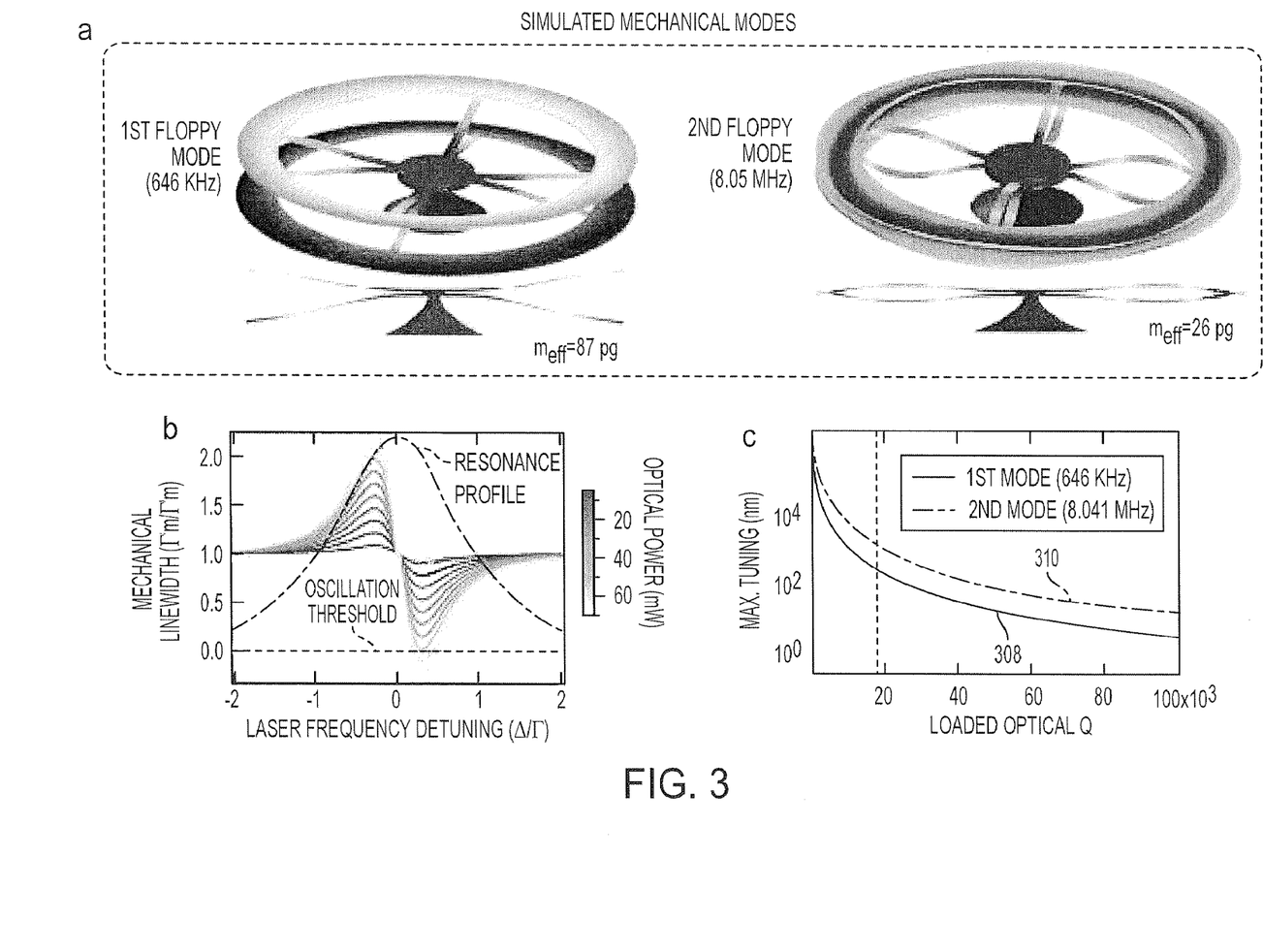

FIG. 3a illustrates the mechanical displacement profile of two floppy mechanical modes that will be driven by the optical gradient force. The threshold optical power at which regenerative mechanical oscillations begin will define the maximum static frequency tuning, i.e., an upper limit for the static operation of the device. As illustrated in FIG. 3b, when the pump laser is blue-detuned with respect to the cavity frequency ($\Delta \equiv \omega_p - \omega_0 > 0$), it provides optical gain for the thermally excited mechanical modes and effectively reduces the mechanical damping, narrowing the mechanical resonance linewidth ($\Gamma_m$). At the threshold power $P_{th}$, the optomechanical gain exceeds the intrinsic losses of the mechanical modes ($\Gamma_m < 0$, line 302 in FIG. 3b) and they enter into regenerative oscillations. As a result, any optical signal going through the cavity is strongly modulated at the mechanical frequency $\Omega_m$ of these modes. The floppy mechanical modes shown in FIG. 3a are the first two mechanical modes that are strongly driven by optical field due to their mostly vertical and opposing (or bright) motion of the two rings. The threshold input power to achieve regenerative oscillations for a mechanical mode with effective motional mass $m_{eff}^{(m)}$, optomechanical coupling rate $g_{om}^{(m)}$, and mechanical quality factor $$Q_m = \Omega_m / \Gamma_m \text{ is given by } P_{th}^{(m)} = m_{eff}^{(m)} \Omega_m \omega_0^4 (8 Q_m Q^3 (g_{om}^{(m)})^2 \eta_c)^{-1}$$

where $\eta_c \equiv (1 \pm \sqrt{T_{min}})/2$ is the ideality coupling factor for an undercoupled (−) or overcoupled (+) cavity, $T_{mm}$ is the transmission value exactly on resonance, and $Q = Q_i(1-\eta_c)$ is the loaded optical quality factor. Here we assume that the cavity is excited close to the optimal cavity frequency detuning $\Delta \approx -\Gamma/2$ (where $\Gamma = \omega_0/Q$) and that the cavity parameters are within the unresolved sideband limit, $\Omega_m \ll \Gamma$. At this detuning point, the cavity transmission is given by $T(\Delta = -\Gamma/2) = 1 + 2(\eta_c - 1)\eta_c$. Using this transmission value and the power threshold expression above together with Eq. (1), an expression can be derived for the maximum static frequency shift for an optomechanical cavity as limited by optomechanical oscillations of the $m^{th}$ mechanical mode, $$\Delta\omega_{th}^{(m)} = -(m_{eff}^{(m)} \Omega_m / 2kQ_m)(g_{om}/g_{om}^{(m)})^2(\omega_0/Q)^2 \approx -(m_{eff}^{(m)} \Omega_m / 2kQ_m)(\omega_0/Q)^2. \quad (2)$$

In the case of the fundamental anti-symmetric (bright) mechanical mode (m=1), this expression does not depend on the optomechanical tuning efficiency $g_{om}$ since $g_{om}^{(1)} \approx g_{om}$; a high value of $g_{om}$ however ensures that large tuning can be achieved using low optical powers (see Eq. (1)). For double-ring cavities however, many mechanical modes will have similar $g_{om}(m)$, for example $g_{om}^{(2,3)}/g_{om}^{(1)} \approx (60\%, 64\%)$, where (2,3) stands for the second and third order bright mechanical modes, therefore Eq. (2) can still predict the maximum frequency shift as limited by optomechanical oscillations of the higher order mechanical modes.

FIG. 3c shows the maximum wavelength tuning predicted by Eq. (2) for a double-ring cavity with a loaded optical $Q = 18 \times 10^3$ (vertical dashed line), where each curve represent the maximum wavelength tuning as limited by regenerative oscillations from the two mechanical modes shown in FIG. 3a. The lines 308 and 310, respectively, correspond to the first and second mechanical modes shown in FIG. 3a with parameters $\Omega_m / 2\pi = (0.646, 8.041)$ MHz, $m_{eff} = (87, 26)$ pg, k=1.44 N/m, and $Q_m = 4$.

Since these modes may have distinct mechanical quality factors, we represent in the shadowed regions of FIG. 3c the tuning range spanned when the mechanical quality factor varies between $1<Q_m<10$. The overlap of these region show that depending on their mechanical quality factor, the second order mode may reach oscillation threshold before the first mode. These parameters should allow for a maximum static tunability in the few hundred nanometers range as shown in FIG. 3c.

Results

An exemplary apparatus 100 (FIG. 1) as disclosed herein achieved optomechanical tuning exceeding 30 nm using only 13 mW of laser power, well below the regenerative oscillations threshold. The fabricated cavity, shown in FIG. 1(c, d), has a 30 μm diameter and a 3 μm wide ring. Each ring was made of 190 nm thick stoichiometric LPCVD (low-pressure chemical vapor deposition) $Si_3N_4$. The spokes 103-1, 103-2 have cross-section dimensions of 190×500 nm. The air gap 113 between the rings is about 170 nm. A top view of the apparatus under test is shown in FIG. 4a and the experimental setup schematic is illustrated in FIG. 4b. A typical low power transmission spectrum obtained using a tapered optical fiber coupled evanescently to the cavity is shown FIG. 4c. The loaded optical quality factor of the pump resonance was Q=18,000, whereas the mechanical quality factors was $Q_m=2$ for the mechanical mode at 8.05 MHz; for the first order mode at 646 KHz it was too low and was not measured since it was below the noise level in our direct detection setup. Such a low mechanical quality factor is typical in double-ring cavities due to the strong damping caused by gas trapped between the rings (squeeze film effect).

To induce the optical force we used a 13 mW tunable external cavity pump laser centered on an optical resonance at 1580 nm (highlighted in FIG. 4c). The polarization of the pump was adjusted to maximize its coupling to the cavity TE mode. As the pump laser wavelength scans this resonance (0.5 nm steps) from shorter towards longer wavelengths, more power is dropped to the cavity as the laser approaches the resonance. At each pump wavelength step, we recorded the probe transmission over the range indicated by the horizontal arrow in FIG. 4c. Our experimental data demonstrating 32 nm optomechanical tuning is presented in FIGS. 5(a-h). A dramatic effect of the optomechanical tuning can be seen by simply observing under a microscope the color change of the light reflected off the top of the cavity. As the air-gap between the rings is reduced, the thin-film interference effect provides such a view in real time. We show this effect in the sequence of images on the right-side of FIG. 5a. More quantitative evidence is revealed by the pump laser transmission shown in FIG. 5b. The offset curves correspond to different power levels as the laser scans from shorter to longer wavelengths. As the pump power increases (from bottom to top), the optical resonances show the typical triangular shape of a bistable cavity. Such bistable transmission curves result from the redshift induced by the change in the air-gap due to optical forces. At the highest pump power of 13 mW, the bistability extend over 32 nm, which spans twice the optical free spectral range. This indicates that a very large optomechanical shift is induced. The probe transmission curves at each pump wavelength are shown as offset curves in FIG. 5a. Since the pump power actually dropped to the cavity is related to the pump transmission curve and input power as $P_d=(1-T)P_{in}$, the minimum pump transmission (around 1617 nm) is T=0.4 and, therefore, the maximum power dropped to the cavity is $P_d=7.8$ mW. Using Eq. (1) with this power value and a spring constant of k=1.44 N/m, as obtained from static finite element simulations, we calculate the expected wavelength shift to be $\Delta\lambda=33$ nm, in good agreement with the measured value.

As the dropped power in the cavity increases, we observe tuning of mechanical resonant frequency (i.e., optical spring effect) as well as a reduction in the mechanical resonance linewidth (i.e., optomechanical amplification). These two effects can be seen in FIGS. 5c and 5d, where we show a density plot of the transmitted pump RF spectrum measured using a 125 MHz photodetector ($PD_2$ in FIG. 4b). The observed shift in the mechanical resonant frequency, from 8 MHz to 32 MHz, corresponds to a stiffening of the mechanical resonator of $k'/k=(\Omega'/\Omega)^2\approx16$. The stiffening of the resonator is so large that the mechanical modes exhibit anti-crossings with higher frequency modes. Two of such anti-crossings at 17 and 31 MHz are highlighted in FIG. 5d. Each of these anti-crossings are actual doublets formed by a symmetric (dark) lower frequency mechanical mode $\Omega_d/2\pi=(16, 31)$ MHz, shown in FIG. 4(e, f), and an anti symmetric (bright) higher frequency mechanical mode $\Omega_b/2\pi=(17,32)$ MHz, shown in FIG. 5(g, h). The mechanical frequencies shown in these figures are obtained from finite element simulations and agree with the measurements within <10% difference.

Figure 5:
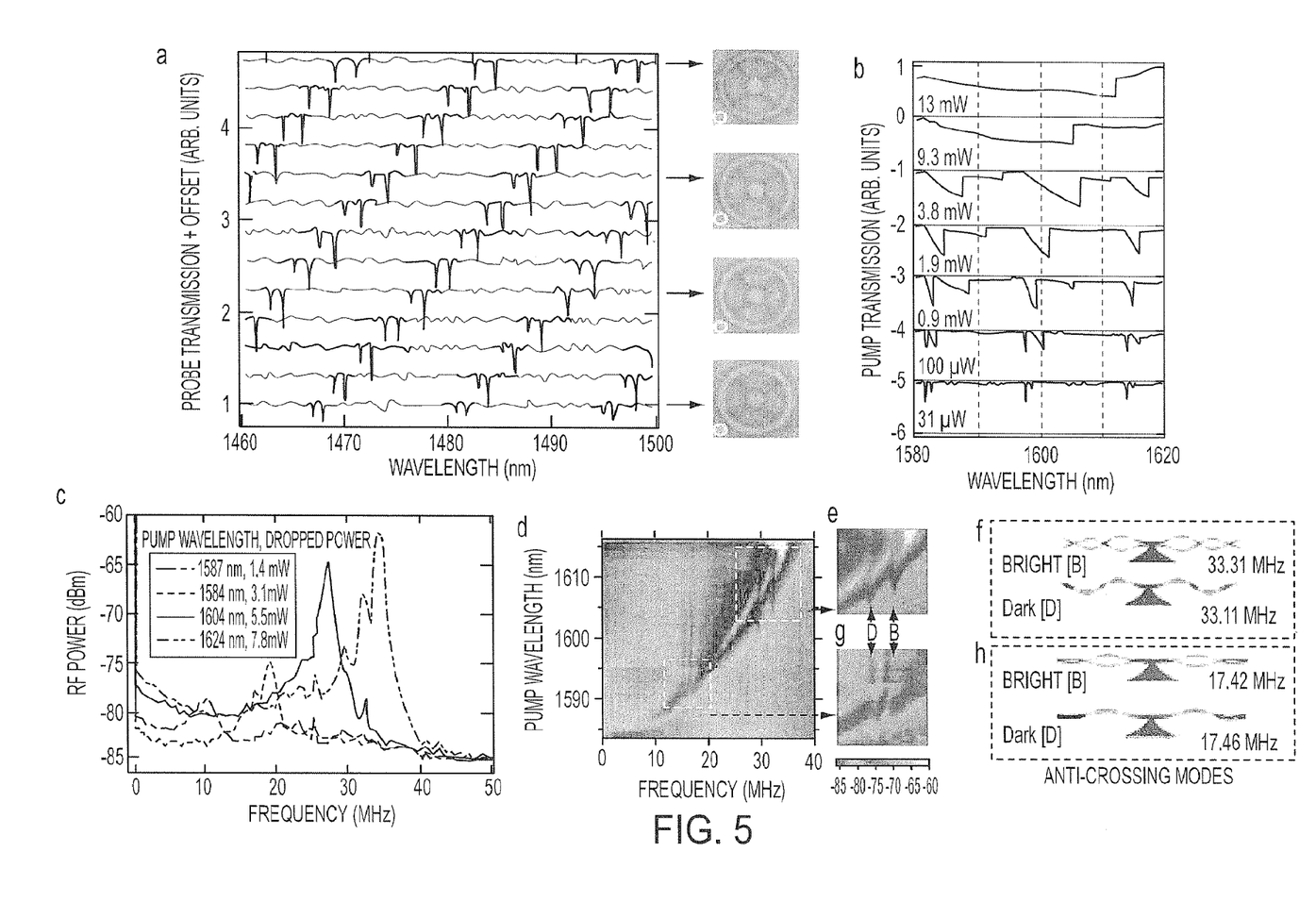

After the anti-crossing with the dark modes, the mechanical mode preserves its frequency and appears as a straight vertical trace in the density plot of FIG. 5d, whereas after the anti-crossing with the bright mode, the mechanical mode keeps increasing its frequency due to the spring effect. The major benefit of this stiffening for static tuning applications is the reduction of thermal driven vibrations, which scales as $(k_BT/k')^{1/2}$ according to the equipartition of energy. The reduction of the mechanical linewidth leads to an increase in the mechanical quality factor, as shown in FIG. 5c, which was measured to increase from $Q_m\approx2$ to $Q_m\approx30$. This demonstrates that the disclosed apparatus is indeed well below the optomechanical oscillations threshold.

The optical absorption inside the cavity raises its temperature and also contributes to the measured shift. There is a thermo-optic contribution arising from the refractive index change ($\delta n=\alpha\Delta T$, where $\alpha=4\times10^{-5}$ $K^{-1}$ for $Si_3N_4$) and a thermo-mechanical contribution due to thermal expansion of the cavity. Although such thermal expansion could also cause a change in the gap between the rings, it has been shown that the major thermo-mechanical shift is caused by radial expansion. We verified both numerically and experimentally that these thermal contributions are negligible. Considering both thermal contributions, we may write $\Delta\omega_{th}=g_T\delta T+g_R\delta R$, where $g_T=\omega\alpha/n_g$ and $g_R=\omega/2\pi R$. One can estimate the radial expansion of the ring using the relation $\delta R/R=\alpha_L\delta T$, where $\alpha_L\approx10^{-6}$ $K^{-1}$ is the SiN thermal expansion coefficient. To estimate the temperature change we assume an absorption loss of 0.06 dB/cm, which corresponds to an optical absorption quality factor of $Q_{abs}=5.2\times10^6$. The total thermal resistance of the cavity, as calculated through the finite element method, is $R_{th}=7\times10^5$ K/W. Using these parameters, the estimated temperature change in the ring is $\delta T=R_{th}P_{heat}=23°$ K, where the heating power is calculated from the intra-cavity energy U as $P_{heat}=\omega_0U/Q_{abs}$. Using the above relation, we calculate the thermal contribution to the frequency shift. The thermal expansion term gives $g_T\delta T/2\pi=-4.5$ GHz, whereas the thermooptic effect gives $g_T\delta T/2\pi=-99$ GHz. The total thermal shift is therefore $\Delta\omega_{th}/2\pi=-103$ GHz, or equivalently $\Delta\lambda_{th}=0.86$ nm, which corresponds to 3% of the measured shift. To verify that the thermal contribution is indeed small, we tested a device in which the two rings collapsed and were stuck to each other and therefore do not experience the usual optomechanical tuning. Such a small contribution from thermal shift was verified experimentally is in agreement with previous results on double-ring and spider-web cavities where the optomechanical tuning is the dominant effect. Some contribution could also arise from the nonlinear Kerr effect, however due to low finesse of our cavity (F≈180) and relatively large effective mode area ($A_{eff} \approx 8 \times 10^{-13}$ m$^2$), we estimated the Kerr contribution $\Delta\lambda_{Kerr} = \lambda_2 FP_d/(\pi n_g A_{eff})$, where $n_2 = 2.5 \times 10^{-15}$ cm$^2$W$^{-1}$ is the nonlinear refractive index of Si$_3$N$_4$ and $n_g = 1.8$ is the cavity mode group index, to be below 1 µm and therefore negligible in our device.

The disclosed apparatus and associated methods demonstrate efficient (400 µW/nm), broadband (across C and L communication bands) tuning of optical resonances using gradient force actuation of an optical device. Competing effects such as the thermo-optic effect and the Kerr effect contribute only to a small extent to the overall optical frequency shift. The embodied optomechanical tuning approach is not only competitive with other known tuning methods, but also advantageous since it simplifies the fabrication process by avoiding metal contacts, etc. Increased static tuning will be achievable using the embodied apparatus and methods with further optimization of one or more of the resonator parameters such as spoke thickness, inter-ring gap, ring width, and/or higher laser power. Other applications of high tuning efficiency, gradient force optomechanical devices may enable the further understanding of dynamic effects of radiation and near field forces.

Figure 6:
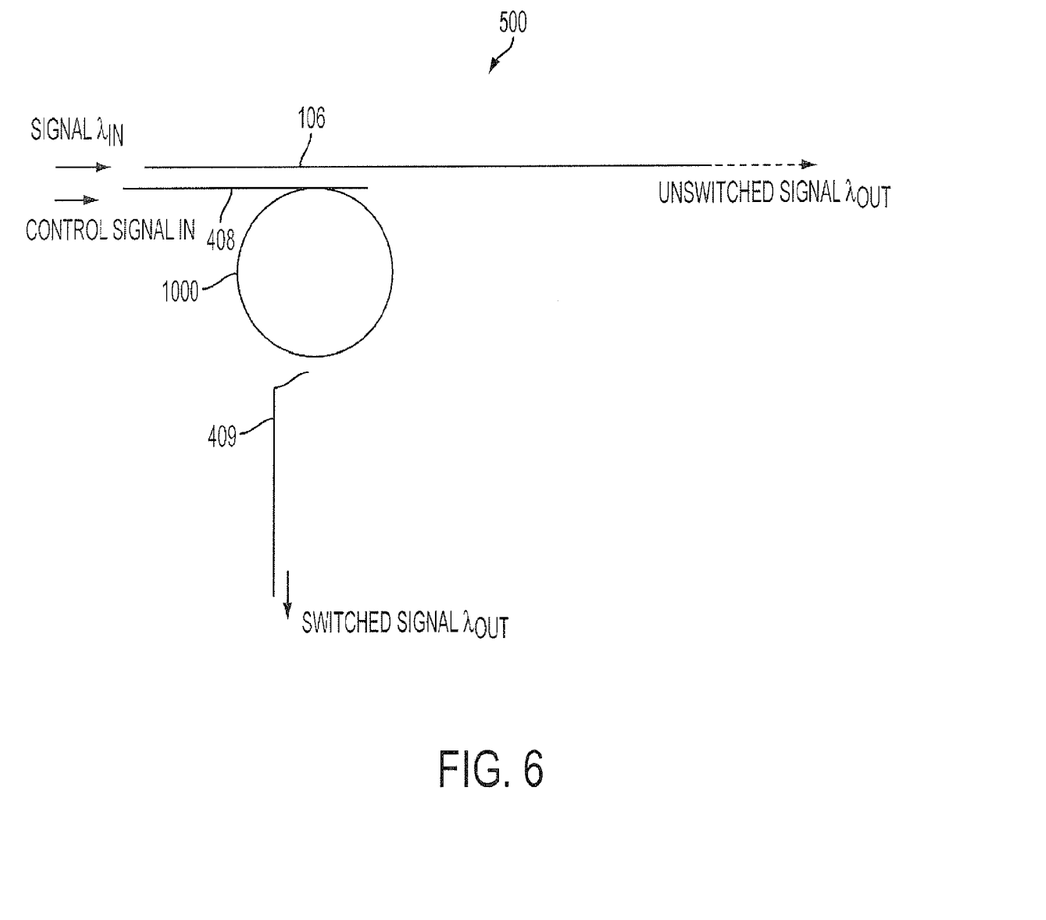
FIG. 6 schematically illustrates a single wavelength optical switch according to an illustrative embodiment of the invention.

A particularly advantageous application of the technology described herein above is an apparatus for selectively propagating an optical signal; e.g., an optical switch, and an associated method for selectively propagating (switching) an optical signal. FIG. 6 schematically illustrates a single wavelength optical switch 500. The switch 500 is identical to the apparatus 100 illustrated in FIG. 1 except that an output signal waveguide 409 is disposed adjacent a periphery of the resonator component 1000 in a known manner that allows evanescent coupling of the input signal k propagating in the resonator cavity into the output signal waveguide 409. When the control (pump) signal (input via control signal waveguide 408) is detuned so that the input signal is not coupled into the cavity, the input signal is not switched and continues to propagate along the signal waveguide 106. However, when the pump signal is tuned to the resonant frequency of the cavity for the selected input wavelength λ, the input wavelength λ then propagates in the resonator component 1000 and is evanescently coupled into the output signal waveguide 409 and routed as desired.

Figure 7:
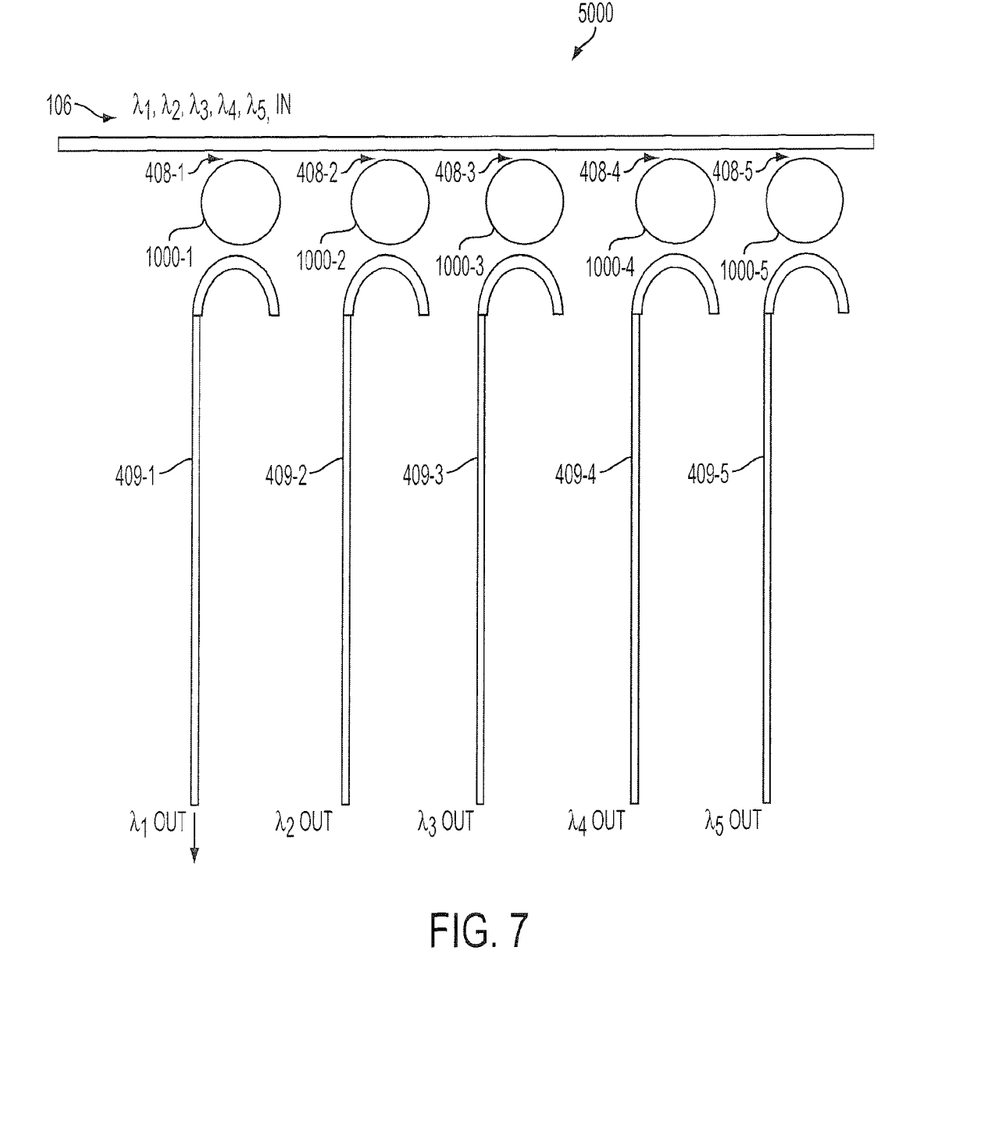
FIG. 7 schematically illustrates a broadband optical switch according to an illustrative embodiment of the invention.

FIG. 7 schematically illustrates a broadband (multiple) wavelength optical switch 5000. The illustrated switch 5000 includes five ring resonator components 1000-1, 1000-2, 1000-3, 1000-4, 1000-5, an input signal waveguide 106 disposed such that a signal wavelength $\lambda_n$ in a spectrum (e.g., C-band, L-band) propagating in the input signal waveguide can evanescently couple to a selected one of the resonator component cavities, a control signal waveguide 408 coupled to the resonator components or the input signal waveguide, or multiple control signal waveguides 408-1, 408-2, 408-3, 408-4, 408-5 coupled to respective resonator components, and output signal waveguides 409-1, 409-2, 409-3, 409-4, 409-5 coupled to respective resonator components disposed such that a desired signal wavelength $\lambda_n$ (n=1-5) propagating in any one of the resonator components can evanescently couple to the respective output signal waveguide. Each of the resonator components 1000-n may have a slightly different diameter (e.g., 30 µm±several µm) and different air gaps mediated by respectively different control (pump) signal wavelengths and powers to tune each resonator component cavity to a selected signal wavelength $\lambda_n$. It will be appreciated that the switch 5000 may comprise two or more apparatus as described, five being disclosed for example only.

The exact ordering of the wavelengths is programmable by controlling the control (pump) signal wavelength and power levels. The ordering can be reconfigured as a function of time allowing for an optically controlled, reconfigurable optical spatial routing switch.

The use of the terms "a" and "an" and "the" and similar references in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening.

The recitation of ranges of values herein are merely intended to serve as a shorthand method of referring individually to each separate value falling within the range, unless otherwise indicated herein, and each separate value is incorporated into the specification as if it were individually recited herein.

All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not impose a limitation on the scope of the invention unless otherwise claimed. No language in the specification should be construed as indicating any non-claimed element as essential to the practice of the invention.

It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents.

We claim:

1. A tunable optomechanical apparatus, comprising:
   a resonator component consisting of two coupled optical microring resonators disposed in a stacked relationship and which are supported by a central hub structure, having an air gap between the stacked resonators that is between 500 to 200 nanometers (nm), wherein each of the optical microring resonators is one of a solid disc and a ring with spokes;
   an input signal waveguide disposed adjacent a periphery of the resonator component in a manner that allows evanescent coupling of light from the input signal waveguide into a resonant cavity of the resonator component; and
   a control signal waveguide coupled to at least one of the resonator component and the input signal waveguide,
   wherein the tunable optomechanical apparatus is characterized by a broadband tunability of optical resonances over a wavelength range from 1530 to 1625 nanometers.

2. The apparatus of claim 1, wherein the resonator component is characterized by an optical quality factor, Q, where Q is in the range of between 1,000 to 100,000.

3. The apparatus of claim 2, where Q is in the range of between 15,000 to 22,000.

4. The apparatus of claim 1, wherein the resonator component has a diameter from five microns (µm) to 100 µm.

5. The apparatus of claim 1, wherein each of the resonator components has a diameter of 30 µm.

6. The apparatus of claim 1, further comprising an output signal waveguide disposed adjacent a periphery of the resonator component in a manner that allows evanescent coupling of light from the resonator cavity into the output signal waveguide.

7. The apparatus of claim 6, further comprising:
a plurality of resonator components each of which corresponds to a selected signal wavelength, predetermined by the geometry and design of the resonator component; and
a respective plurality of output signal waveguide coupled to respective resonator components.

8. The apparatus of claim 7, further comprising a respective plurality of a control signal waveguides each coupled to a respective resonator component.

9. A method for selectively propagating an optical signal, comprising:
providing an apparatus including a resonator component consisting of two coupled optical microring resonators disposed in a stacked relationship and which are supported by a central hub structure, having an air gap between the stacked resonators that is between 50 to 200 nanometers (nm), wherein each of the optical microring resonators is one of a solid disc and a ring with spokes, an input signal waveguide disposed adjacent a periphery of the resonator component in a manner that allows evanescent coupling of light from the waveguide into a resonant cavity of the resonator component, a control signal waveguide coupled to the apparatus, and an output signal waveguide disposed adjacent a periphery of the resonator component in a manner that allows evanescent coupling of light from the cavity of the resonator component into the output signal waveguide;
propagating an input optical signal, $\lambda 1$, over a wavelength range from 1530 to 1625 nanometers, along the input signal waveguide;
evanescently coupling the input optical signal into the resonator component cavity by suitably changing the air gap dimension using a radiative force from a control signal evanescently coupled into the resonator component; and
outputting the coupled input optical signal, $\lambda 1$, to the output signal waveguide.

10. The method of claim 9, further comprising:
providing a plurality of resonator components each corresponding to a selected signal wavelength, and a respective plurality of output signal waveguides;
propagating the input optical signal along the input signal waveguide, wherein the input optical signal includes a plurality of wavelengths $\lambda 1, \lambda 2, \ldots \lambda n$;
evanescently coupling a selected one of the input optical signal wavelengths into the respective resonator component; and
outputting the coupled selected one input optical signal to the respective output signal waveguide.

11. The method of claim 9, further comprising providing a respective plurality of control signal waveguides each coupled to a respective resonator component.

* * * * *

UNITED STATES PATENT AND TRADEMARK OFFICE
CERTIFICATE OF CORRECTION

PATENT NO.        : 9,057,829 B2
APPLICATION NO.   : 13/697560
DATED             : June 16, 2015
INVENTOR(S)       : Michal Lipson et al.

Page 1 of 1

It is certified that error appears in the above-identified patent and that said Letters Patent is hereby corrected as shown below:

In the claims

Column 10, Line 46, Claim 1, change "500" to --50--.

Signed and Sealed this
Tenth Day of November, 2015

Michelle K. Lee
*Director of the United States Patent and Trademark Office*